(12) United States Patent
Chiaroni et al.

(10) Patent No.: US 6,356,371 B1
(45) Date of Patent: *Mar. 12, 2002

(54) METHOD AND A CIRCUIT FOR CONCATENATING BINARY INFORMATION, AND USE IN OPTICAL PACKET TRANSMISSION

(75) Inventors: Dominique Chiaroni, Antony; Corinne Chauzat, Creteil; Michel Sotom, Paris; Dominique De Bouard, St Geneviere des Bois, all of (FR)

(73) Assignee: Alcatel, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/102,001

(22) Filed: Jun. 22, 1998

(30) Foreign Application Priority Data

Jun. 23, 1997 (FR) .............................. 97 07772

(51) Int. Cl.[7] ...................... H04B 10/00; H04B 10/12; H04J 14/00
(52) U.S. Cl. ...................... 359/140; 359/130; 359/123; 359/124
(58) Field of Search ............................... 359/140, 130, 359/123, 124

(56) References Cited

U.S. PATENT DOCUMENTS

| 4,467,468 A | | 8/1984 | Miller | |
|---|---|---|---|---|
| 5,589,967 A | * | 12/1996 | Auffret | ............ 359/123 |
| 5,636,045 A | * | 6/1997 | Okayama | ............ 359/140 |
| 5,703,708 A | * | 12/1997 | Das | ............ 359/140 |
| 5,987,197 A | * | 11/1999 | Kersey | ............ 385/24 |
| 6,151,146 A | * | 11/2000 | Chiaroni et al. | ............ 359/158 |

FOREIGN PATENT DOCUMENTS

| EP | 0497668 A1 | 8/1992 | | |
|---|---|---|---|---|
| EP | 0729057 A2 | 8/1996 | | |
| GB | WO 8800415 | * | 1/1988 | ............ 359/140 |

OTHER PUBLICATIONS

B. Bostica et al, "Electro–Optical ATM Digital Cross–Connect System Based on Cell Aggregation and Compression" Proceedings of the International Switching Symposium, Yokohama, Oct. 25–30, 1992, vol. 2, Oct. 25, 1992, Institute of Electronics, Information and Communication Engineers, pp. 422–426.

L. Tancevski et al, "Interferometric Noise Reduction in Crosstalk Corrupted Optical WDM and TDM Switching Fabrics", IEEE Photonics Technology Letters, vol. 7, No. 10, Oct. 1, 1995, pp. 1213–1215.

* cited by examiner

*Primary Examiner*—Leslie Pascal
*Assistant Examiner*—Agustin Bello
(74) *Attorney, Agent, or Firm*—Sughrue, Mion, Zinn, Macpeak & Seas, PLLC

(57) ABSTRACT

In packet time-division multiplexing communications systems using optical networks, an optical method and circuits used in electrical-to-optical conversion interfaces assure that data rates of the electrical domain match the data rates of the optical domain. An optical method of concatenating binary information contained in successive time windows of an input signal includes forming g converted input signals obtained by amplitude modulating g optical carrier waves having different wavelengths, each converted input signal presenting, within the time windows, amplitude modulation as a function of the input signal. The method also includes forming a multiplex signal made up of a combination of g delayed signals obtained by applying delays to the converted input signals, the delays being such that any two consecutive delayed signals are offset in time by the duration w of the time windows.

16 Claims, 12 Drawing Sheets

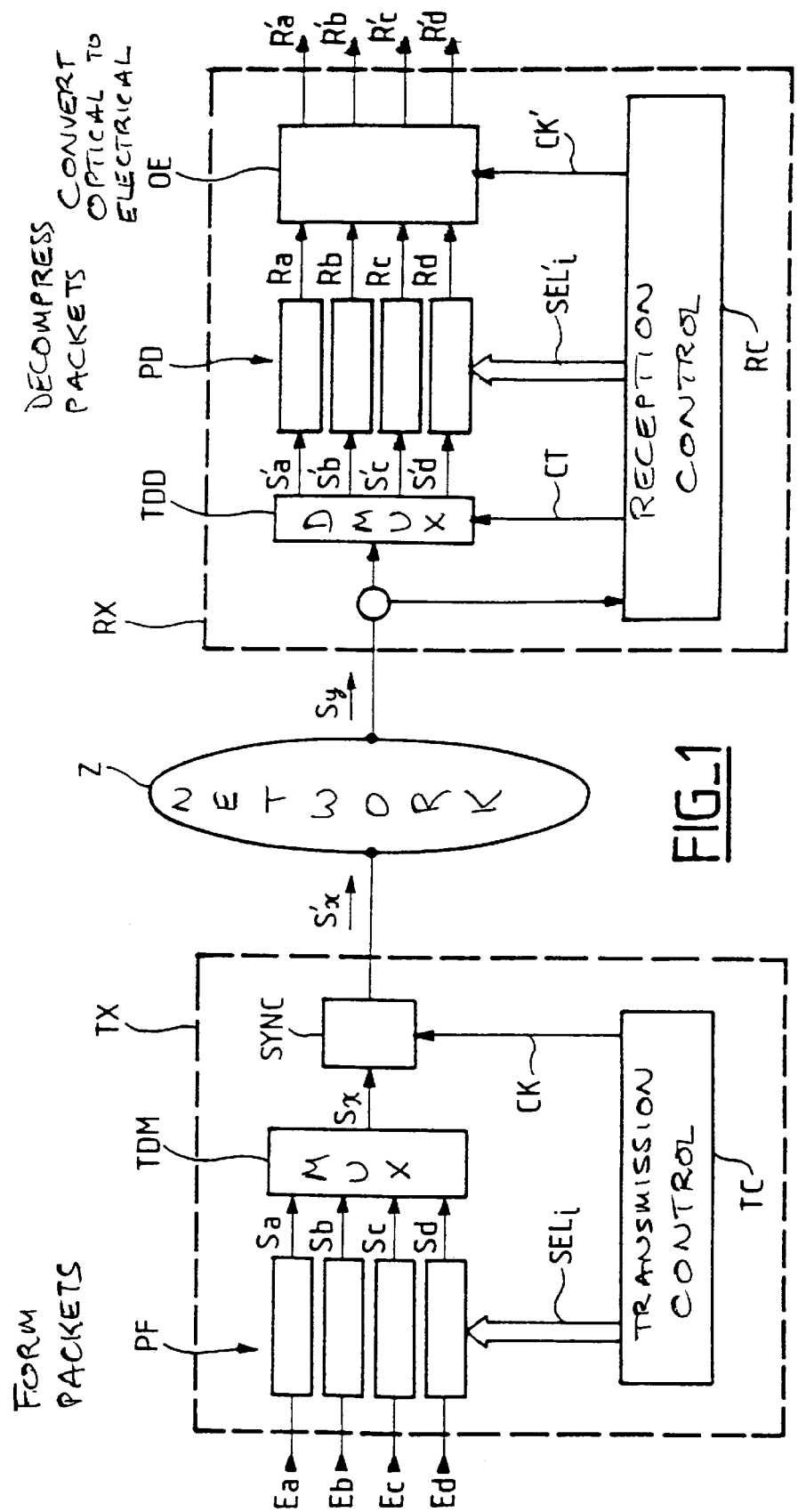
FIG_1

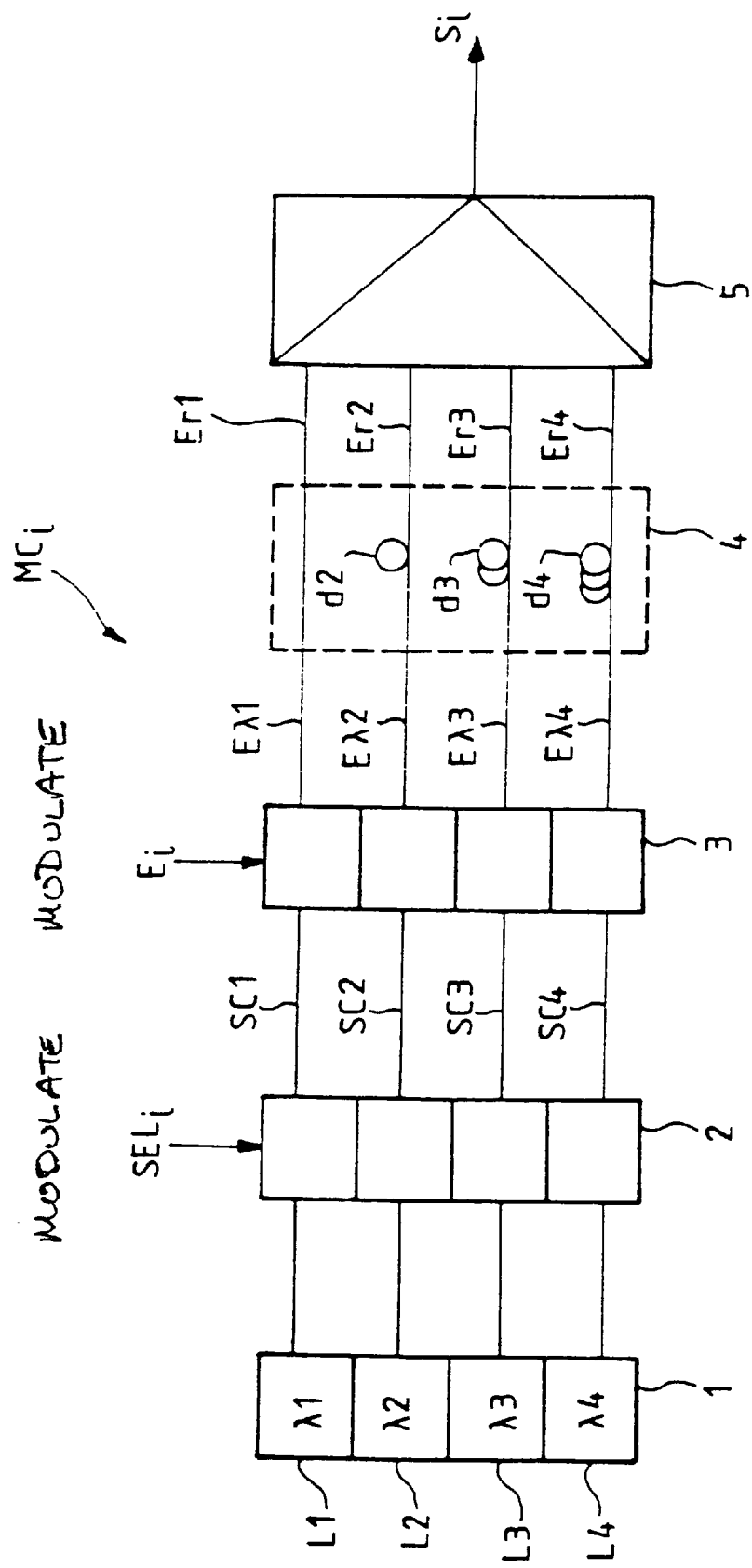
FIG_2

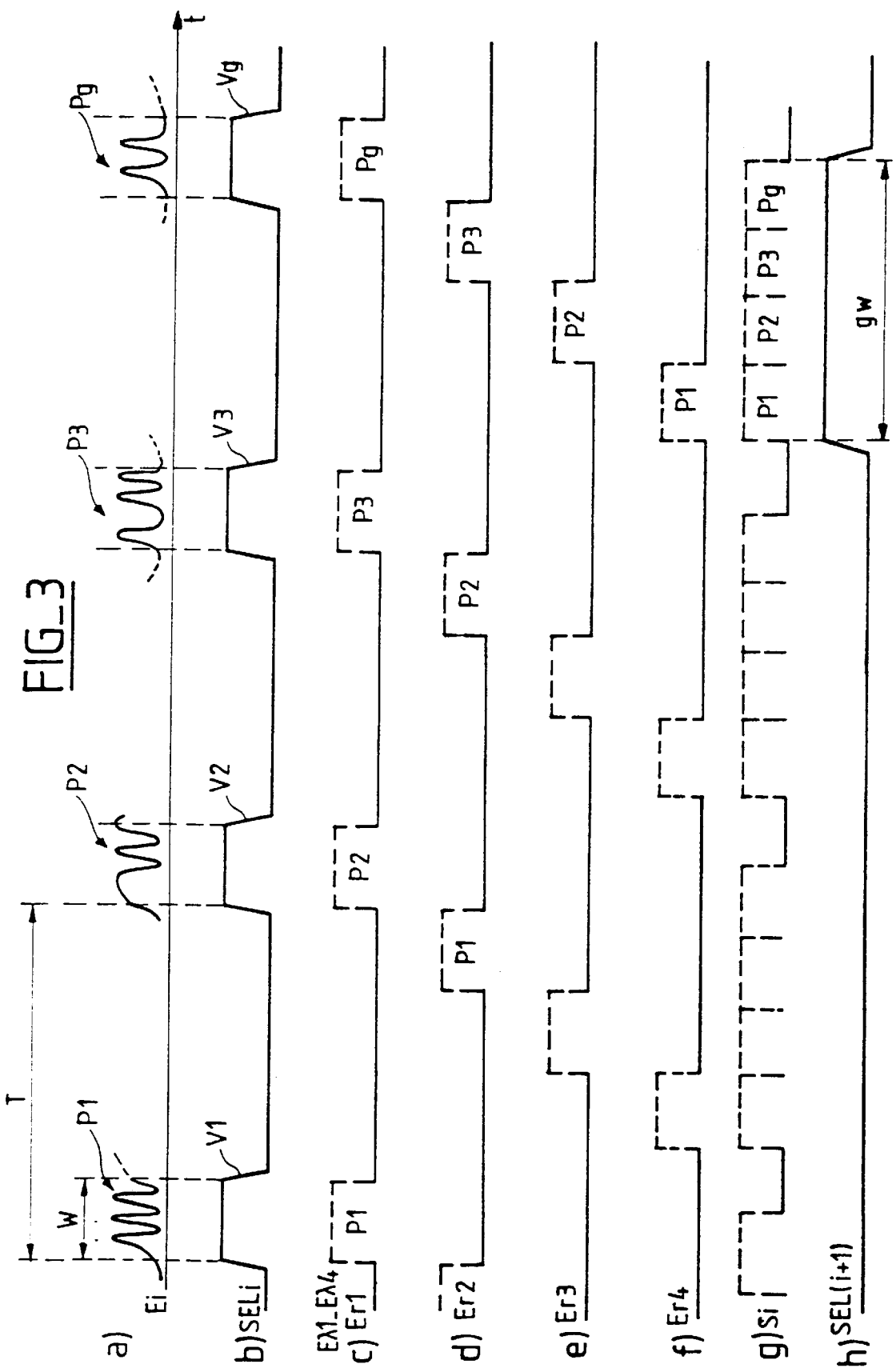

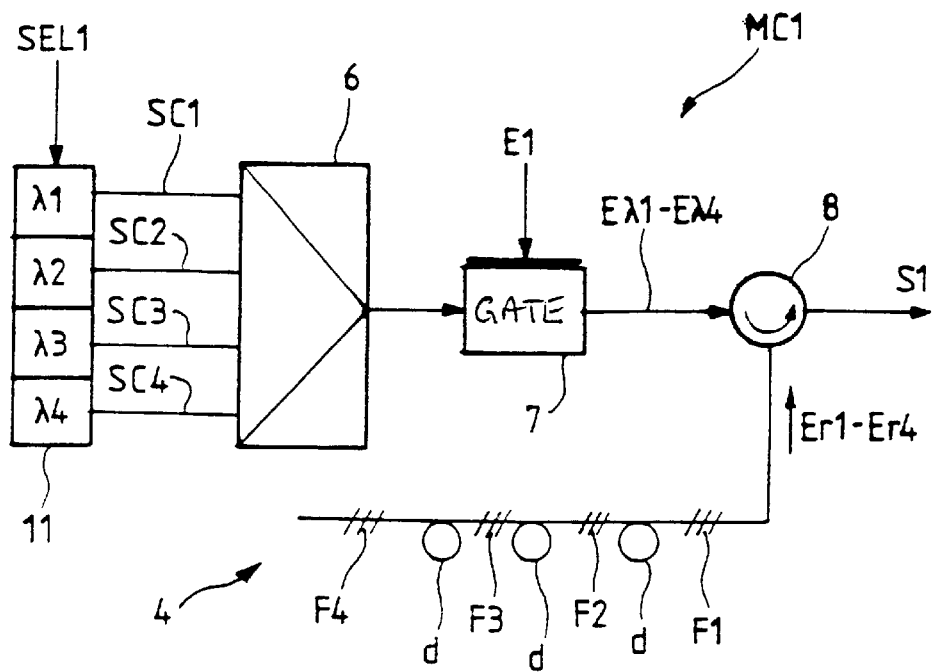
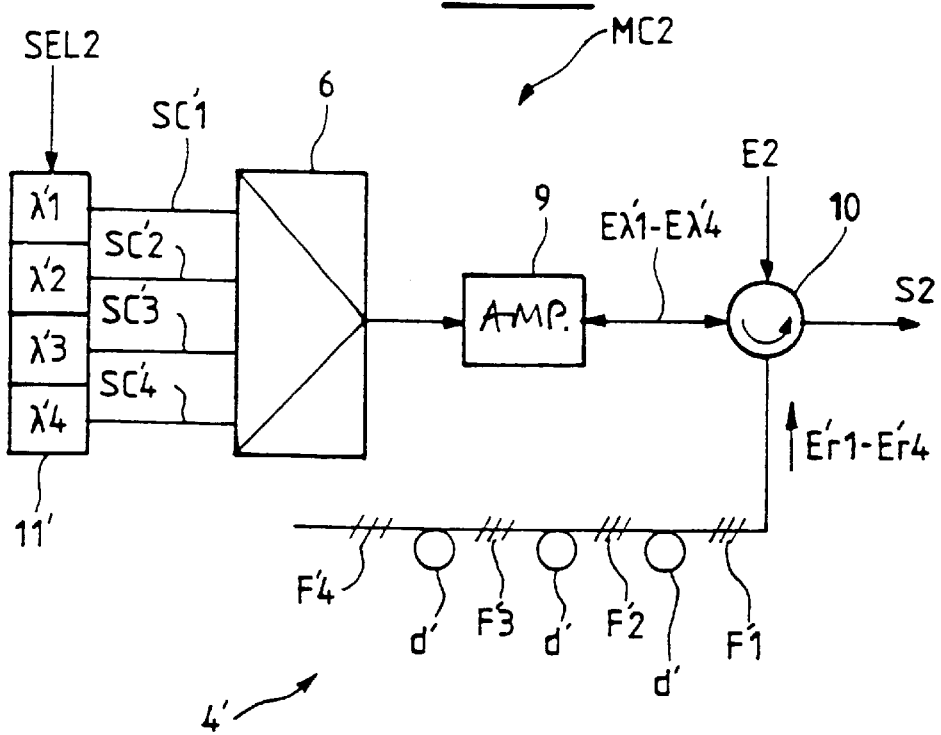

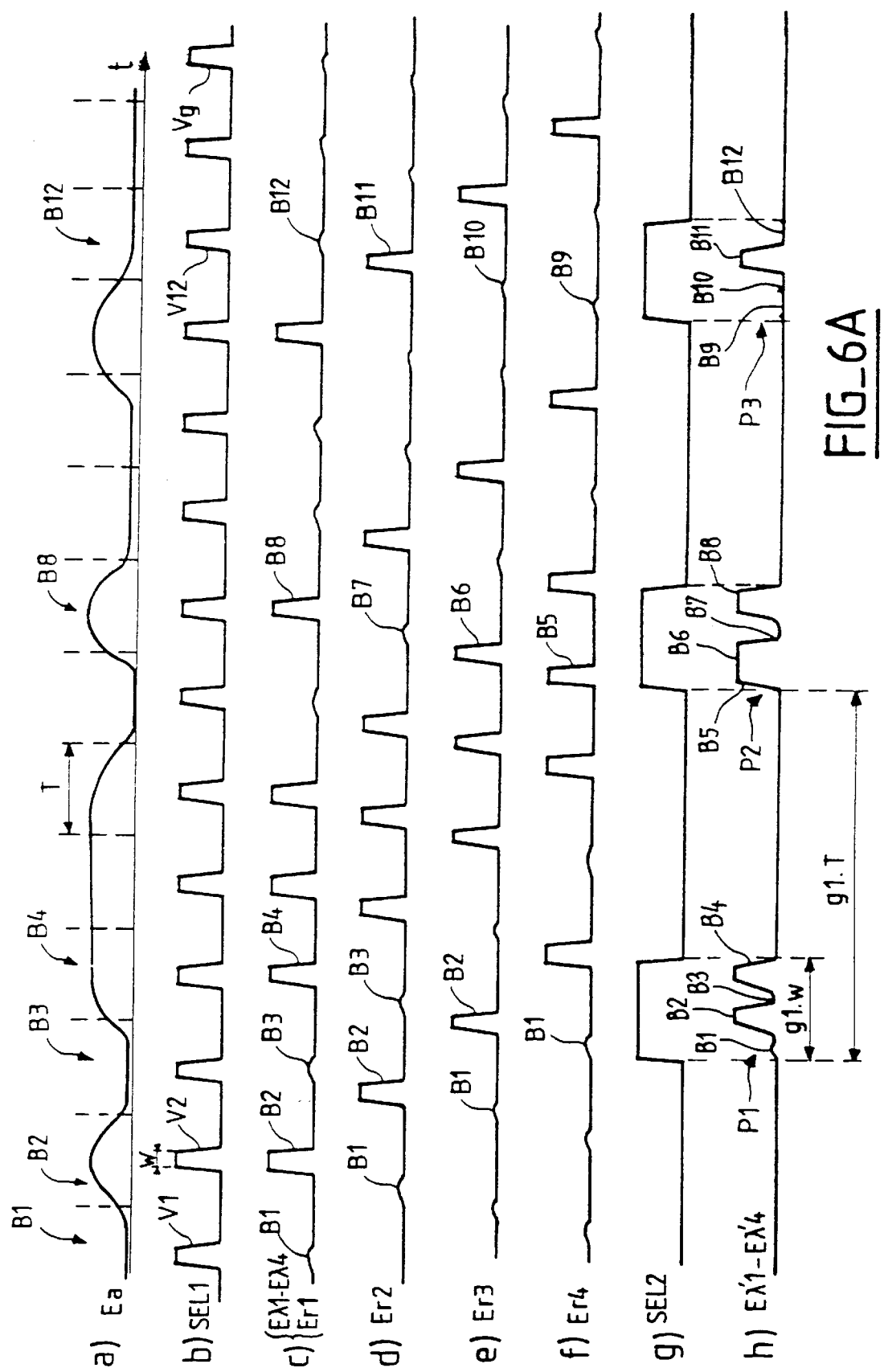
FIG_6A

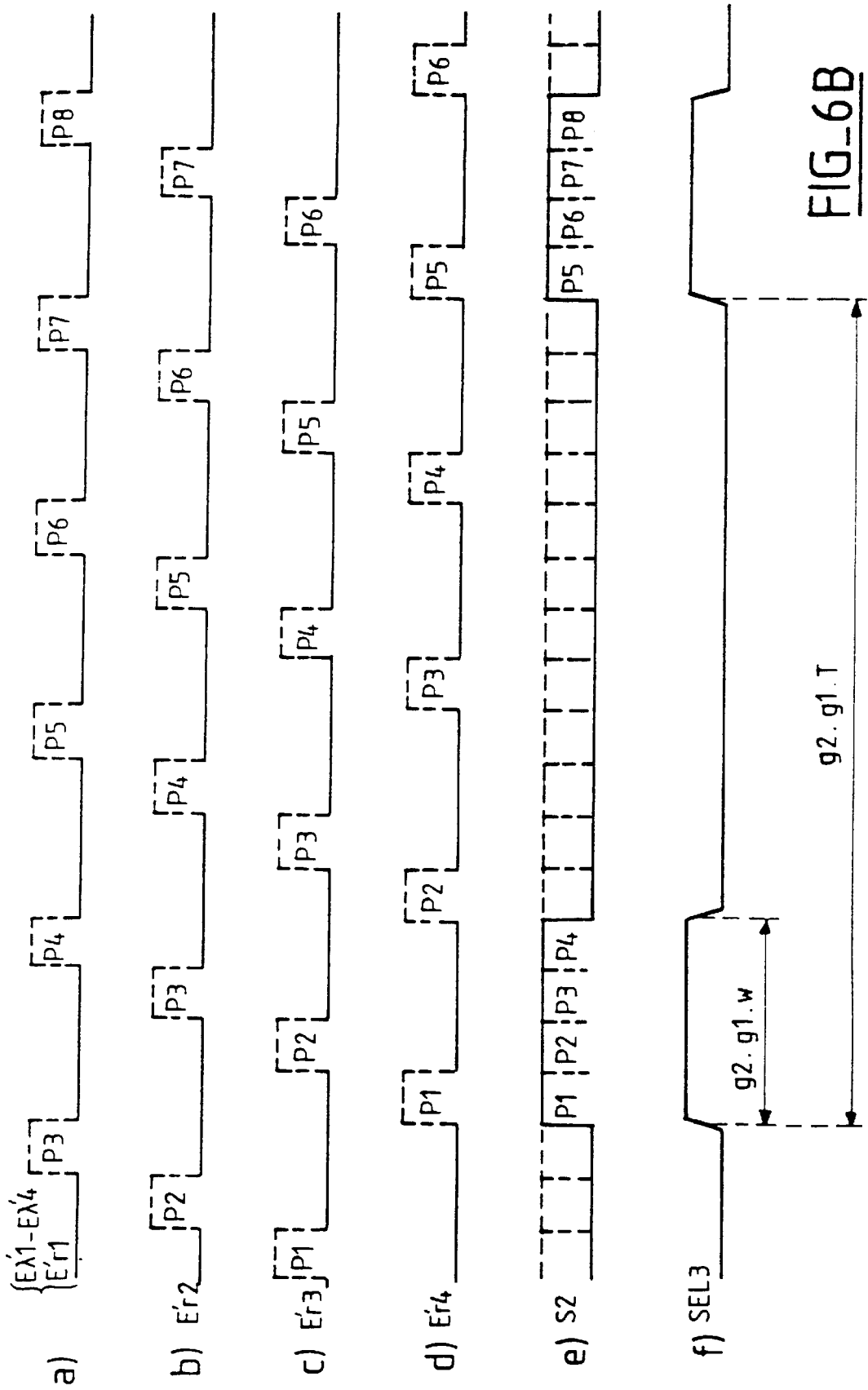

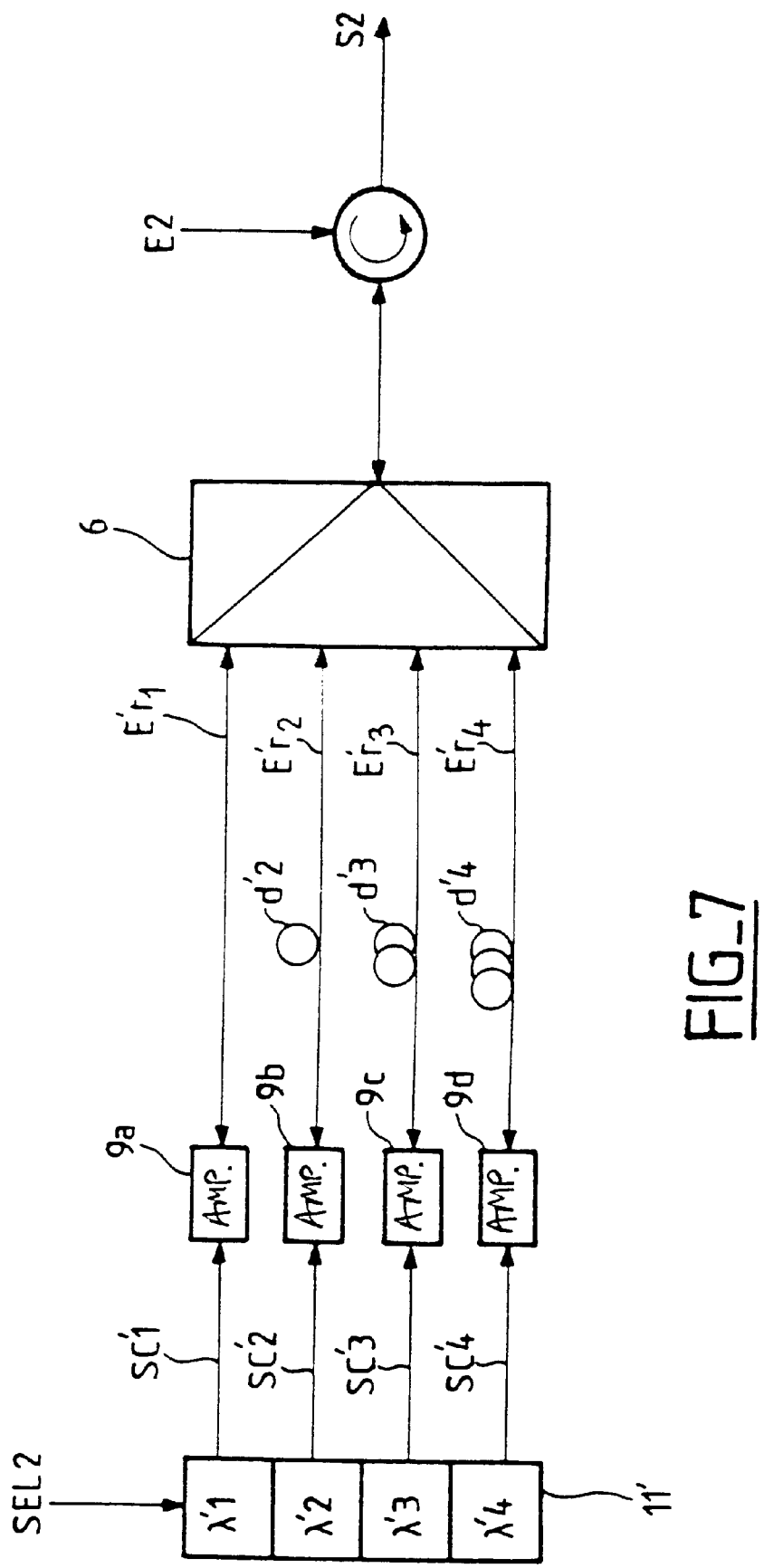
FIG_7

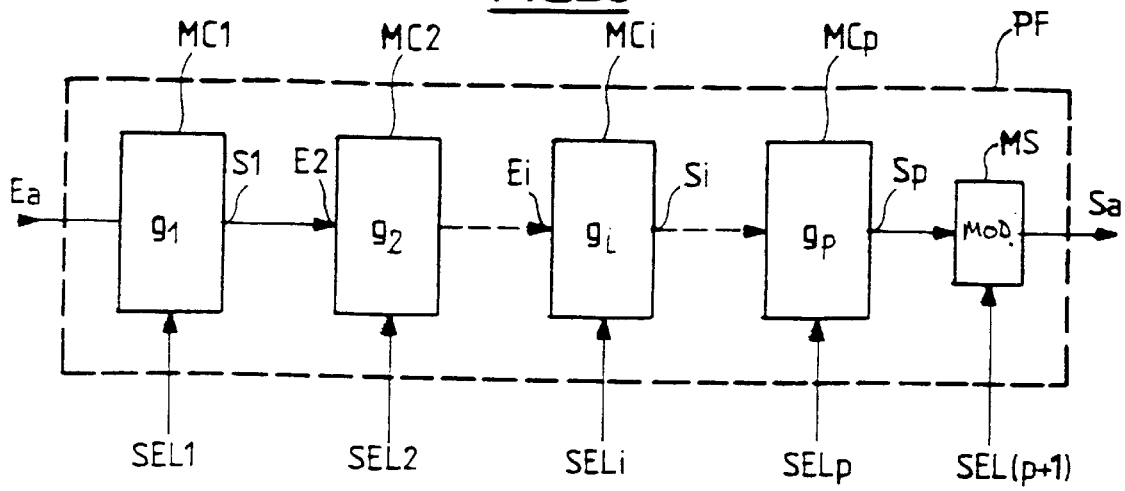
FIG_8
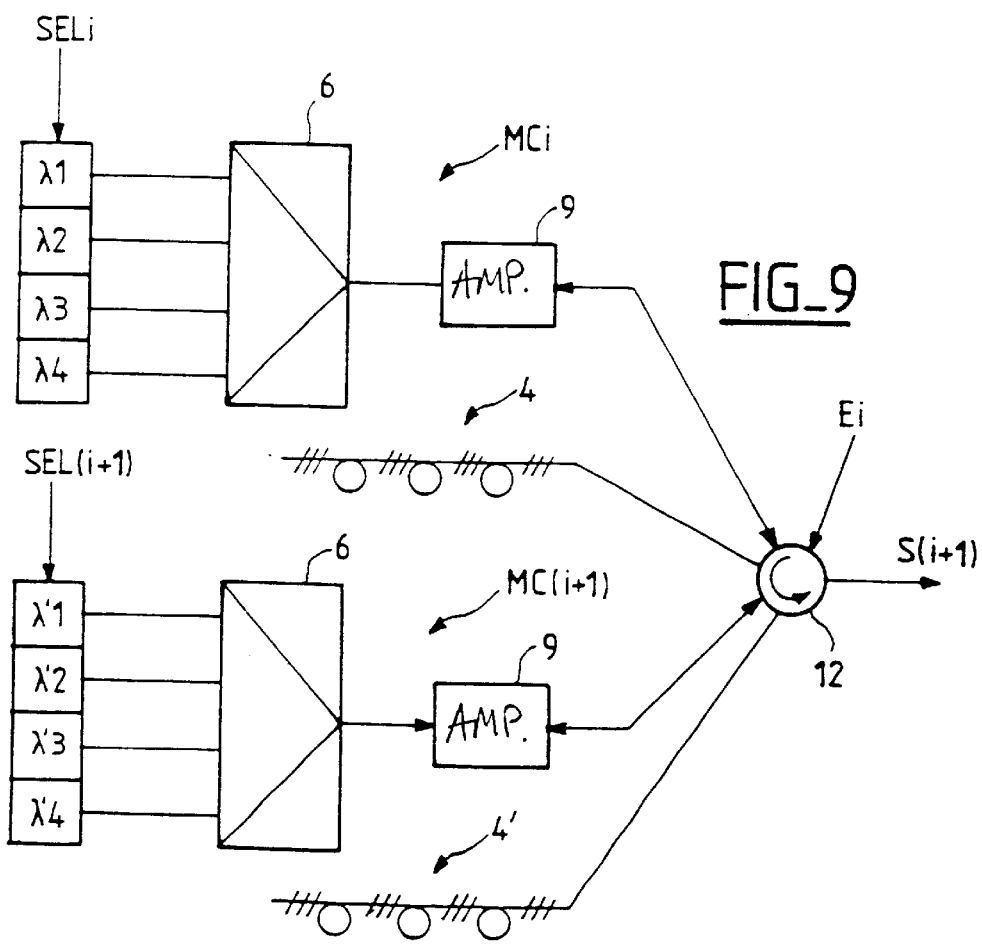
FIG_9

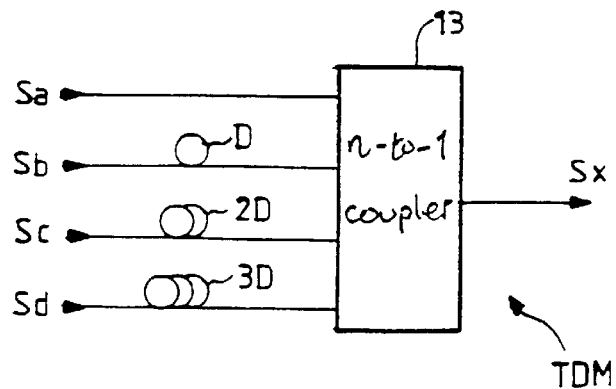
FIG_10
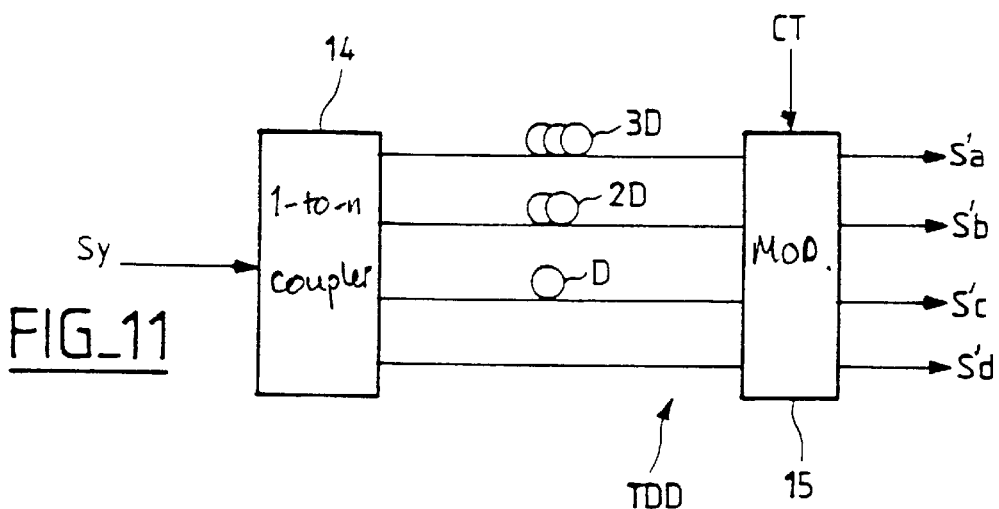
FIG_11
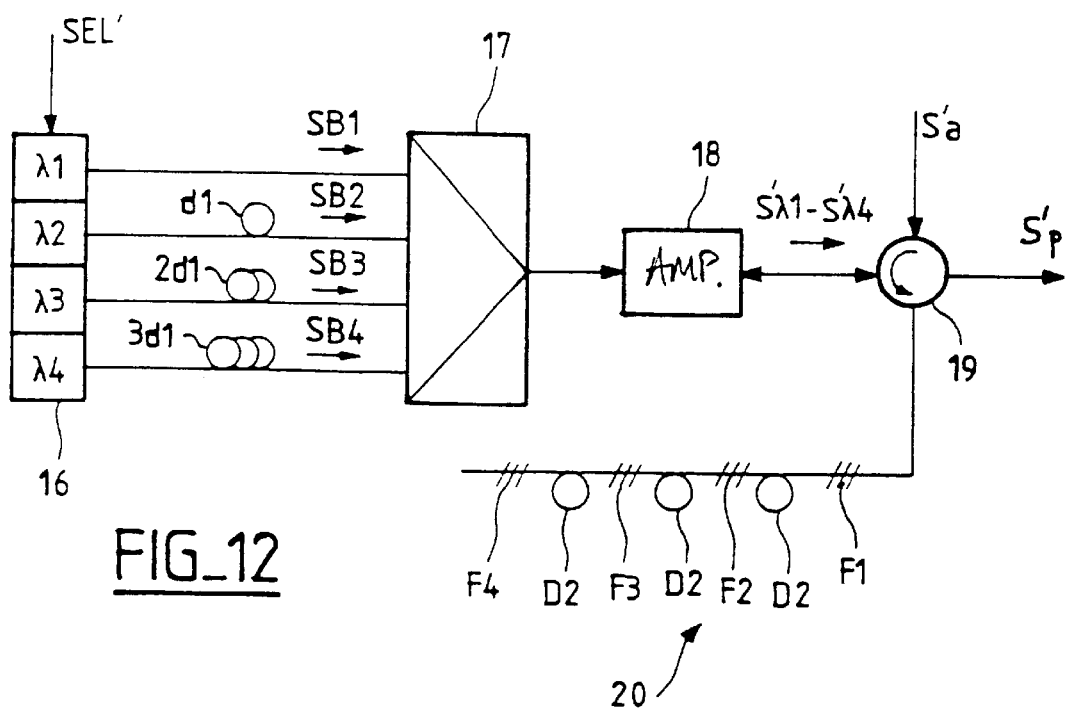
FIG_12

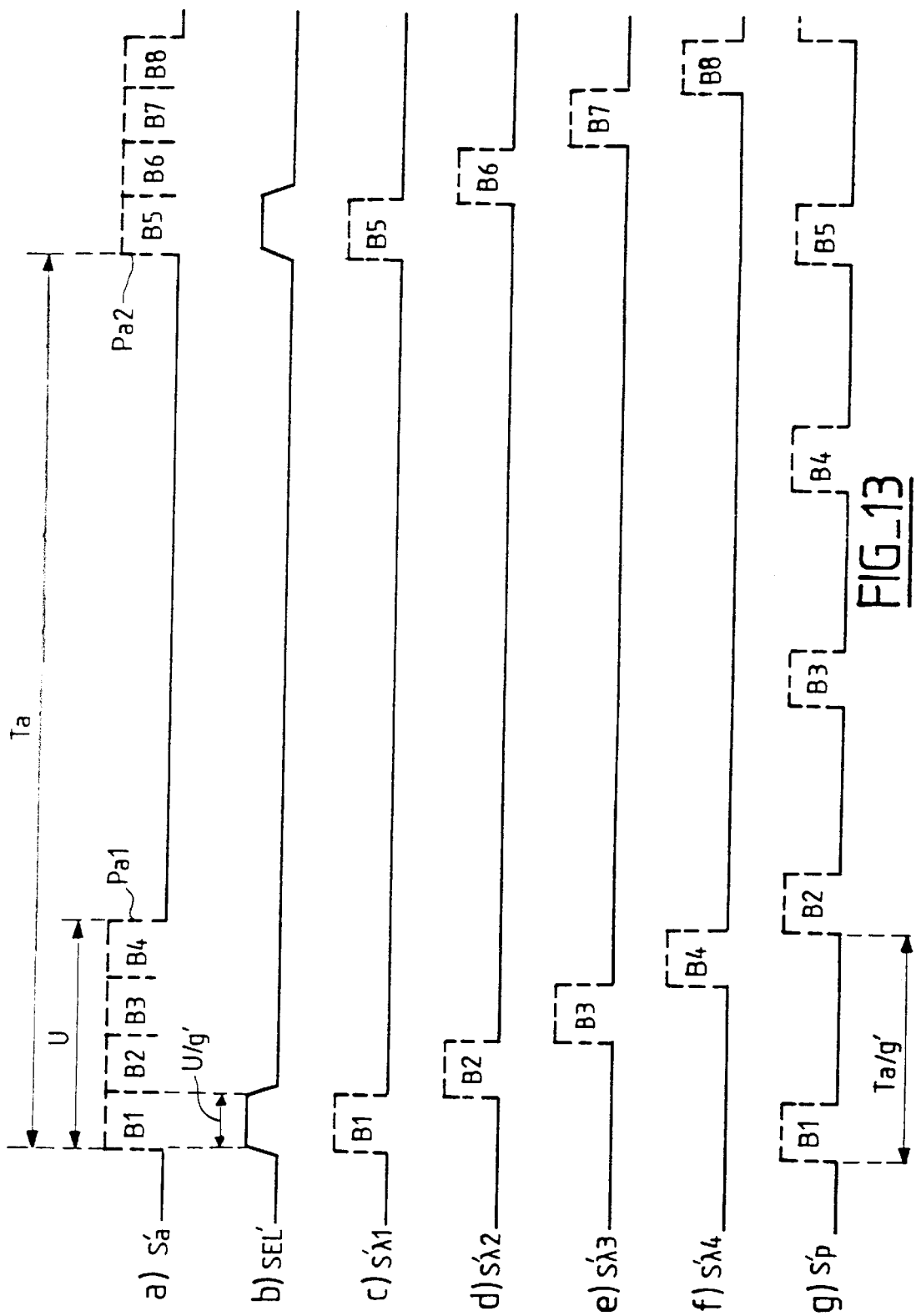
FIG_13

FIG_14
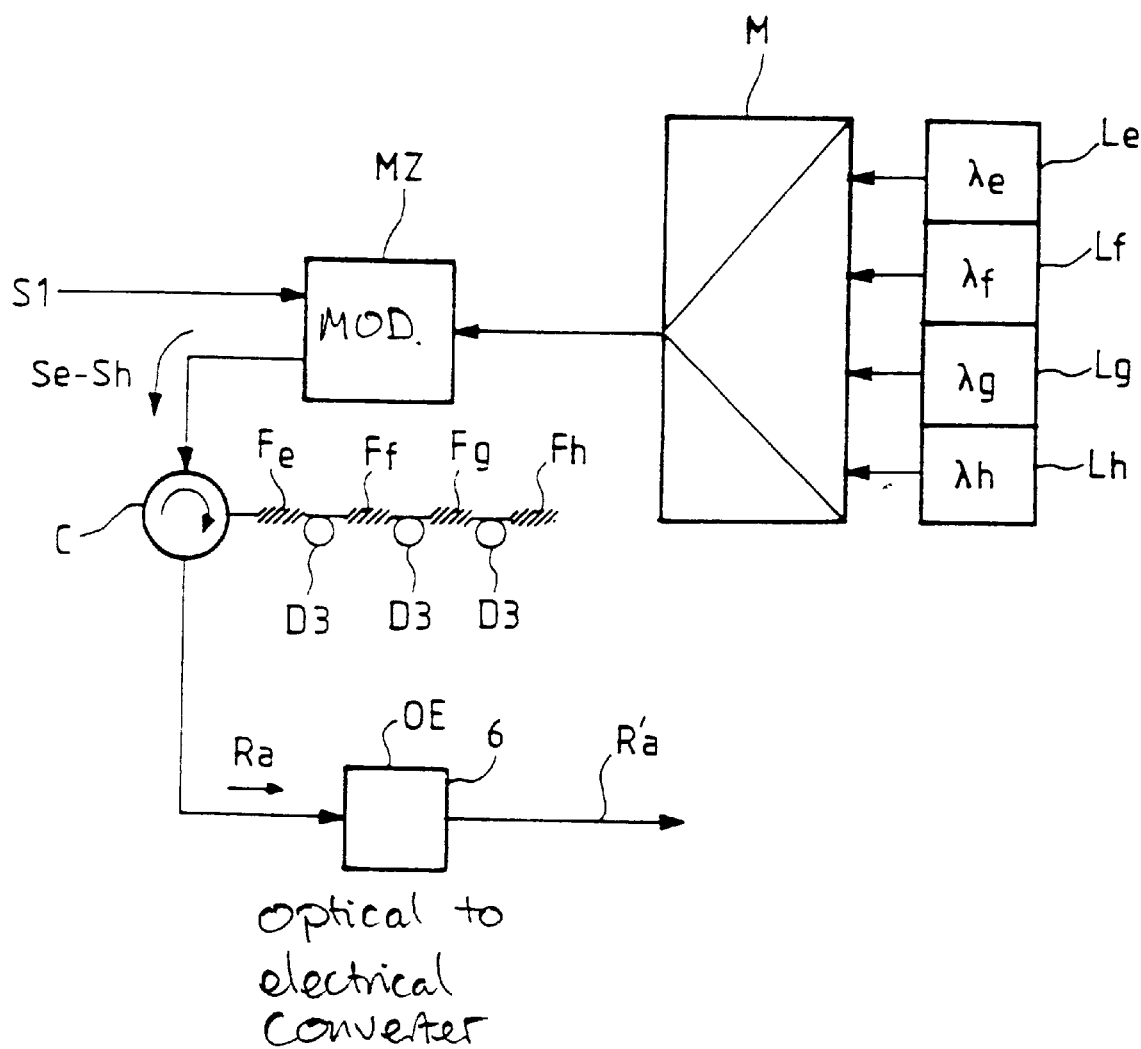

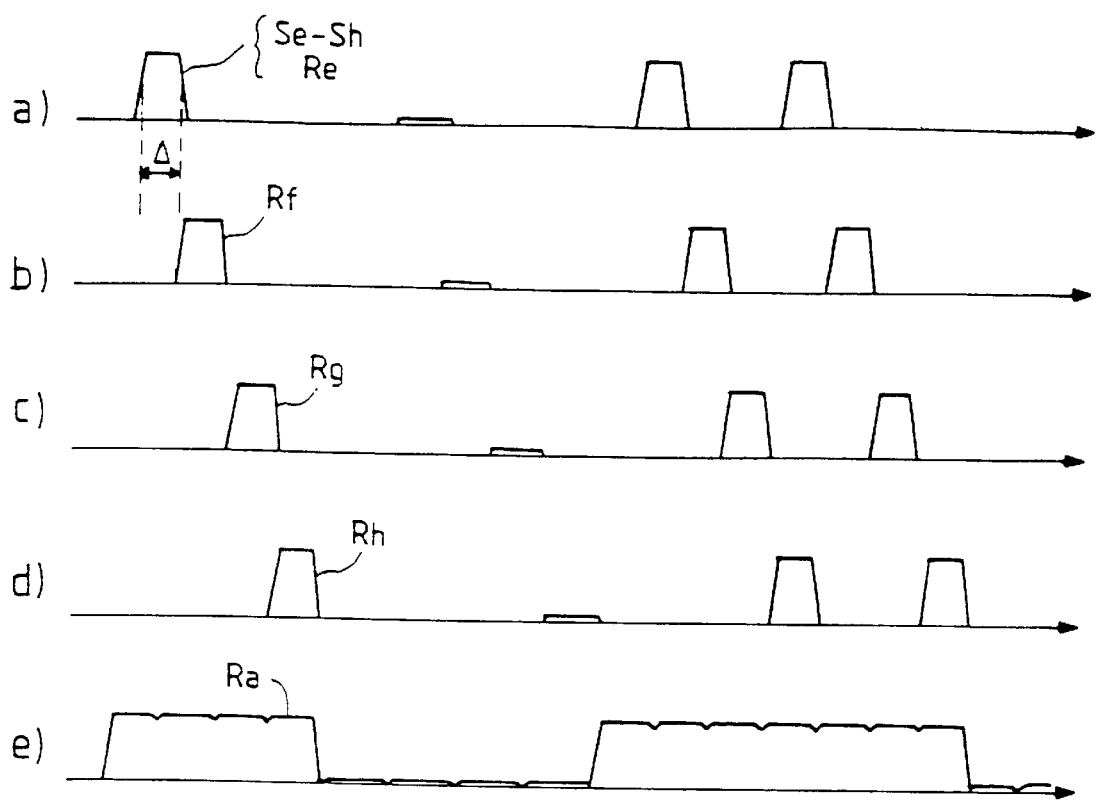

METHOD AND A CIRCUIT FOR CONCATENATING BINARY INFORMATION, AND USE IN OPTICAL PACKET TRANSMISSION

The invention relates to communications system using optical networks.

BACKGROUND OF THE INVENTION

In general, the information conveyed in such systems is constituted by binary data in the form of pulses clocked at a determined clock frequency. Binary value is represented by pulse amplitude. Initially, the pulses are in electrical form, and then they are converted into an optical signal obtained by modulating the power (or the amplitude) of an optical carrier wave.

The advantage of optical systems is that the optical fibers that make up transmission links enable data to be transmitted at much higher rates than the rates possible on electrical lines.

In analogous manner, a difference of the same order of magnitude exists between the data-rate capacities of optical-domain systems and those of electrical-domain circuits. One of the problems posed is thus to design electrical-to-optical conversion interfaces that enable the data-rates to be matched.

One solution consists in providing time-division multiplexing whereby a plurality of electrical signals to be transmitted are taken synchronously in parallel manner and are then transmitted in serial manner over the network, in optical form. Advantageously, the pulses forming the transmitted data are compressed to make best possible use of the passband of the optical network.

In a particular case applicable in ATM-type networks, such time-division multiplexing is performed on packets of successive bits of the various signals rather than on the bits of said signals.

However, the interface that performs these compression, packet-forming and parallel-to-serial conversion operations must be compatible with the performance of electronics, and must not be expensive to implement.

OBJECTS AND SUMMARY OF THE INVENTION

To solve those problems, the invention proposes methods of concatenating and deconcatenating binary information, which methods make it possible to perform compression, packet-forming, and decompression entirely optically, by making use of the spectrum dimension of the optical domain so as to avoid creating interference noise.

To this end, the invention provides a method of concatenating binary information contained in successive time windows of an amplitude-modulated synchronous input signal, said windows being of duration w and of period T not less than twice the duration w, wherein, with g being a number lying in the range 2 to T/w, said method consists in particular in:

forming g converted input signals obtained by amplitude modulating respective ones of g optical carrier waves having different wavelengths, each converted input signal presenting, within said time windows, amplitude modulation as a function of said input signal; and forming a multiplex signal made up of a combination of g delayed signals obtained by applying delays to said converted input signals, the delays being such that any two consecutive delayed signals are offset in time by said duration w of the time windows.

Thus, the invention makes it possible to concatenate the binary information from the input signal in groups of g bits or in groups of g blocks of successive bits.

In a first possibility, said converted input signals are combined before said delays are applied to them, by making use of the differences in their wavelengths.

In another possibility, said delays are applied to said converted input signals before they are combined.

Although these two possibilities are functionally equivalent in principle, the first possibility is less costly to implement, as explained below.

In the case when said input signal is a binary signal of period T that is to be initially compressed in a ratio T/w, and then concatenated in groups of g bits with a period equal to g.T, the converted input signals are obtained by amplitude modulating the q carrier waves by a sampling clock signal constituted by pulses of frequency 1/T, of constant amplitude, and of width equal to said duration w so as to form g optical sampling signals, and then by respectively amplitude modulating said optical sampling signals as a function of the input signal.

In another case, the input signal is a binary signal already organized into blocks of binary data, the blocks being of time width equal to w and being spaced apart with a period T. The binary signal is thus constituted by pulses of frequency not less than 2/T and including blocks of binary data contained in respective ones of successive time windows of duration w and of period T. It is then possible to concatenate the blocks in groups of g blocks with block group period equal to g.T, by making provision for the converted input signals to be obtained by amplitude modulating the carrier waves by a selection signal constituted by pulses of frequency 1/T, of constant amplitude, and of width equal to said duration w, so as to form g optical selection signals, and then by respectively amplitude modulating said optical selection signals as a function of the input signal.

The invention further provides a concatenation circuit for implementing the above-defined concatenation method. The circuit comprising:

first means for forming g converted input signals obtained by amplitude modulating respective ones of g optical carrier waves having different wavelengths, each converted input signal presenting, within said time windows, amplitude modulation as a function of said input signal; and second means for forming a multiplex signal made up of a combination of g delayed signals obtained by applying delays to said converted input signals, the delays being such that any two consecutive delayed signals are offset in time by said duration w of the time windows.

By means of the above-described concatenation method, it is theoretically possible to form packets of binary information, i.e. groups containing a large number of bits. In practice, the circuits serving to perform wavelength conversion are of passband that is limited in terms of wavelength, which means that the number g must also be limited. In addition, for certain implementations, increasing the number of carriers gives rise to a proportional deterioration in the signal-to-noise ratio.

In another aspect of the invention, that problem can be solved by forming the packets in a plurality of successive concatenation steps, each of which uses the above-described method.

More precisely, the invention also provides a method of forming packets grouping together binary information contained in successive time windows of a synchronous amplitude-modulated input signal, said windows being of duration w and of period T not less than twice the duration w, said method comprising:

a first concatenation step consisting in applying the above-described concatenation method to said input signal, by taking a determined value g1 for g, so as to form a first multiplex signal; and at least one subsequent concatenation step consisting in applying the above-described concatenation method to said first multiplex signal considered as an input signal whose time windows are of period g1.T, each of which time windows contains g1 successive time windows of the input signal.

The invention also provides a packet-forming circuit for implementing the above-defined method. The circuit comprising a plurality of concatenation circuits connected in cascade.

The invention also provides a method making it possible to perform the operation that is the inverse of the above-described concatenation operation. More precisely, the invention provides a method of deconcatenating packets of binary information contained in an amplitude-modulated synchronous received signal, said packets being of period Ta, and each of them including g' successive blocks of binary information, said method consisting in particular in:

breaking down said received optical signal into g' converted block signals obtained by amplitude modulating respective ones of g' optical carrier waves having different wavelengths, each converted block signal presenting amplitude modulation as a function of the binary information contained in blocks of period Ta and belonging to successive packets of the received optical signal; and forming a deconcatenated signal obtained by combining and delaying said converted block signals so as to form the delayed blocks of period Ta/g'.

The invention finally provides a communications system comprising an optical network, at least one transmitter terminal and at least one receiver terminal, wherein at least one of said transmitter terminals includes packet-forming circuits as defined above having outlets coupled to an optical circuit for time-division multiplexing packets, and wherein at least one of said receiver terminals includes an optical circuit for time-division demultiplexing packets.

BRIEF DESCRIPTION OF THE DRAWINGS

Other aspects and advantages of the invention appear from the following description given with reference to the figures, in which:

FIG. 1 is a diagram showing an optical communications system of the invention;

FIG. 2 is a diagram showing the functions performed by a circuit implementing the concatenation method of the invention;

FIG. 3 is a timing diagram for explaining how the circuit shown in FIG. 2 operates;

FIGS. 4 and 5 show embodiments of the concatenation circuit of the invention;

FIGS. 6A and 6B are timing diagrams respectively serving to explain how the embodiments shown in FIGS. 4 and 5 operate;

FIG. 7 shows a variant embodiment of the concatenation circuit.

FIG. 8 is a diagram showing a packet-forming circuit of the invention;

FIG. 9 shows a detail of the packet-forming circuit;

FIG. 10 shows an embodiment of a circuit for time-division multiplexing packets;

FIG. 11 shows an embodiment of a circuit for time-division demultiplexing packets;

FIG. 12 shows an embodiment of a deconcatenation circuit used to implement a packet-decompression circuit;

FIG. 13 shows timing diagrams for explaining how the circuit shown in FIG. 12 operates;

FIG. 14 shows a binary pulse spreading circuit used as an output stage of the packet decompression circuit; and FIG. 15 shows timing diagrams for explaining how the circuit shown in FIG. 14 operates.

MORE DETAILED DESCRIPTION

FIG. 1 is a diagram showing an optical network communications system of the invention. The system is constituted by one or more transmitter terminals TX connected to one or more receiver terminals RX via an optical network Z.

In the general case, the transmitter terminal TX receives n input signals in electrical or optical form. By way of non-limiting example, the figure illustrates the case where n=4.

The input signals Ea–Ed are n synchronous signals that are amplitude modulated and that represent binary data contained in successive bit times of duration T. These input signals are to be transmitted on n time channels of the optical network, in the form of packets in time-division multiplex, each of which packets contains a predetermined number of information bits from one of the input signals. For this purpose, the n input signals Ea–Ed are received by respective ones of n packet-forming circuits PF whose outlets deliver n optical signals Sa–Sd organized in packets. The signals Sa–Sd are then time-division multiplexed by a circuit for time-division multiplexing packets TDM. The resulting time-division multiplex signal Sx is then delivered to the network Z via a synchronization and re-shaping circuit SYNC.

The packet-forming circuits PF and the synchronization circuit SYNC are controlled by respective selection signals SELi and a clock signal CK, these signals being delivered by an electronic control unit TC for controlling the transmitter terminal.

The output signal S'x of the transmitter terminal TX is transmitted via the network Z and it becomes an input signal Sy for the receiver terminal RX. A coupler k receives the input signal Sy and takes therefrom a portion intended for an electronic control unit RC for controlling the receiver terminal, and another portion intended for a circuit for time-division demultiplexing packets TDD.

The demultiplexer TDD performs serial-to-parallel conversion and delivers n demultiplexed optical signals S'a–S'd corresponding to respective ones of the n transmission channels. The signals S'a–S'd are injected into respective ones of n packet decompression circuits PD which deliver deconcatenated and decompressed optical signals Ra–Rd to optical-to-electrical conversion and resynchronization circuits OE. The circuits OE deliver electrical reception signals R'a–R'd.

By taking a portion from the input signal Sy, the electronic control unit RC recovers the clock therefrom and generates: an electrical control signal CT for controlling the time-division demultiplexer TDD; electrical selection signals SEL'i serving to control the packet decompression circuits PD; and an electrical synchronization signal CK' which controls the circuits OE.

A more detailed description follows of the design and operation of the various elements of the communications system.

FIG. 2 is a diagram showing a concatenation circuit MCi of the invention making it possible to implement packet-forming circuits PF. By way of illustration, FIG. 2 corresponds to the case when binary data items or binary data blocks contained in an input signal Ei are grouped together in groups of four.

The circuit includes a set 1 of light sources L1–L4 capable of generating carrier waves of different wavelengths $\lambda 1$–$\lambda 4$. These sources are connected to a first modulation circuit 2 controlled by an electrical selection signal SELi which defines time windows of width w and of period T delimiting the bits or the blocks of bits of the input signal Ei that are to be concatenated.

The modulator 2 delivers optical selection signals SC1–SC4 to a second modulation circuit 3 controlled by the input signal Ei.

The circuit 3 delivers converted input signals $E\lambda 1$–$E\lambda 4$ which are then delayed by a delay circuit 4 to deliver corresponding delayed signals Er1–Er4 to a combiner 5. The delays are such that any two consecutive delayed signals are offset in time by the duration w of the time windows. For this purpose, the delay circuit 4 comprises, for example, delay lines d2, d3, d4 creating respective delays T–w, 2(T–w), 3(T–w) intended for respective ones of the converted input signals $E\lambda 2$, $E\lambda 3$, $E\lambda 4$. A first inlet of the combiner 5 then receives $E\lambda 1$ directly, while its other inlets receive $E\lambda 2$, $E\lambda 3$, and $E\lambda 4$ via the respective delay lines d2, d3, and d4.

The combiner 5 is preferably an optical multiplexer tuned to the wavelengths $\lambda 1$–$\lambda 4$ so as to deliver the multiplex signal Si constituted by the combination of the delayed signals Er1–Er4 almost without loss.

In the general case in which g bits or blocks of bits are to be concatenated, g optical sources having different wavelengths are provided for forming g converted input signals $E\lambda 1$–$E\lambda g$, and a delay circuit 4 is provided for applying the delays T–w, 2(T–w), ..., (g–1)(T–w) to respective ones of the converted input signals $E\lambda 2$–$E\lambda g$. A multiplex signal Si is then obtained containing groups of g concatenated bits or of g concatenated blocks of bits, of width g.w with a period g.T.

Operation of the circuit shown in FIG. 2 is described below more precisely with reference to the timing diagrams a) to h) in FIG. 3.

In the general case, the input signal Ei is an amplitude-modulated synchronous optical or electrical signal. Successive time windows of width w, and of period T, define the payload portions of the signals, i.e. the binary information (bits, samples of bits, or blocks of bits), that are to be concatenated. Provided that T is not less than 2.w, the circuit makes it possible to group together a number g lying in the range 2 to T/w of bits (or samples or blocks of bits). In the example shown, g=4 and T/w=5.

The timing diagram a) shows an example of how the amplitude of the input signal Ei varies over time. In this example, the signal includes blocks of bits P1, P2, ..., Pg. The timing diagram b) shows the selection signal SELi that is to be applied to the modulator 2, i.e. pulses of width w, of period T, and that cover the blocks P1, P2, ..., Pg, thus forming the windows V1, V2, ..., Vg.

The converted input signals $E\lambda 2$–$E\lambda g$ appear in the timing diagram c) in which only the envelopes have been shown.

The delayed signals Er1–Er4 appear respectively in the timing diagrams c) to f). The multiplexed signal Si resulting from them being combined is shown by the timing diagram g).

The timing diagram h) shows the selection signal SEL(i+1) that must then be provided to retain the payload concatenated groups only. The selection signal SEL(i+1) is made up of pulses of width g.w with a period g.T and that cover the successive blocks of bits P1, P2, ..., Pg.

FIG. 4 shows a first preferred embodiment MC1 of the concatenation circuit MCi, when the input signal Ei is an electrical signal E1.

The circuit includes a set 11 of laser sources modulated by a selection signal SEL1 so as to deliver the optical selection signals SC1–SC4 to a wavelength-division multiplexer 6 whose outlet is connected to an optical gate 7 controlled by the electrical input signal E1. In the general case, the multiplexer 6 can receive g optical selection signals at its inlets, and, in FIG. 4, g=4 has been chosen by way of non-limiting example.

The optical gate 7 delivers combined converted input signals $E\lambda 2$–$E\lambda 4$. The circuit includes a three-port circulator. A first port receives the converted input signals $E\lambda 2$–$E\lambda 4$, a second port is connected to a delay circuit 4 made up of filters F1, F2, F3, F4 connected in cascade via delay lines d, and a third port delivers the multiplex signal S1.

The filters F1–F4 are stop filters tuned to reflect respective ones of the wavelengths $\lambda 1$–$\lambda 4$. To take into account the go-and-return path lengths of the waves, each of the delay lines d is dimensioned to create a delay equal to (T–w)/2.

The circuit shown in FIG. 4 operates in the same way as the circuit shown in FIG. 2 except that the converted input signals are firstly combined before they are delayed, by using the differences in their wavelengths. With the filters F1–F4 being stop filters set to respective ones of the wavelengths $\lambda 1$–$\lambda 4$, and each of the delay lines being dimensioned to create a delay equal to (T–w)/2, the delay circuit reflects the delayed signals Er1–Er4 so that any two consecutive delayed signals are offset in time by the duration w, as shown in the timing diagrams c) to f) of FIG. 3.

Compared with the FIG. 2 embodiment, in which the modulator 3 is made up of a plurality of optical gates connected to the delay line 4, the embodiment shown in FIG. 4 offers the advantage of being less costly because only one gate 7 is necessary for the carrier waves to be modulated by the input signals. However, adjusting the delays d is more difficult to achieve.

FIG. 5 shows another embodiment MC2 of the concatenation circuit MCi. This embodiment is suitable when the input signal Ei is an optical signal E2. It includes a four-port circulator 10. A first port receives the input signal E2, a second port is connected to a semiconductor optical amplifier 9, a third port is connected to a delay circuit 4 made up of filters F'1, F'2, F'3, F'4 connected in cascade via delay lines d', and a fourth port delivers the multiplex signal S2.

The amplifier 9 includes a first port connected to the second port of the circulator 10, and a second port opposite from the first port and connected to the outlet of a multiplexer 6.

As in the preceding example, the multiplexer 6 receives the optical selection signals SC'1–SC'4 delivered by respective ones of four light sources 11' suitable for generating carrier waves that have different wavelengths $\lambda' 1$–$\lambda' 4$ and that are modulated by a selection signal SEL2.

In operation, the selection signal SEL2 modulates the sources 11' which deliver the optical selection signals SC'1–SC'4 carried by respective ones of the wavelengths λ'1–λ'4 and of amplitude that reproduces the amplitude of the selection signal SEL2.

The optical selection signals SC'1–SC'4 are combined by the multiplexer 6, and are then injected into the amplifier 9 via the second port thereof. Via its first port, the amplifier 9 receives the optical input signal E2 delivered by the second port of the circulator 10. The signal E2 is thus injected in the opposite direction. Since the amplifier medium is saturable, the gain applied to the signals SC'1–SC'4 is modulated by the amplitude of the signal E2. The first port of the amplifier 9 then delivers converted input signals Eλ'1–Eλ'4 carried by respective ones of the wavelengths λ'1–λ'4 to the second port of the circulator 10.

The converted input signals Eλ'1–Eλ'4 are applied to the delay circuit 4' via the third port of the circulator 10. As in the preceding embodiment, with the filters F1–F4 being stop filters tuned to reflect respective ones of the wavelengths λ'1–λ'4, and with each of the delay lines d' being dimensioned to create a delay equal to (T–w)/2, the delay circuit reflects the delayed signals E'r1–E'r4 so that any two consecutive delayed signals are offset in time by the duration w, as shown in the timing diagrams c) to f) in FIG. 3.

A first variant embodiment consists in coupling the outlet of the multiplexer 6 directly to the circulator 10, and in placing an amplifier between each source of the set 11' and a corresponding inlet of the multiplexer. This variant offers the advantage that the signal-to-noise ratio is independent of the number of sources, thereby making it possible to increase said number.

Another variant is shown in FIG. 7. In this variant, and as above, the outlet of the multiplexer 6 is coupled directly to the circulator 10. A first source is connected to a corresponding inlet of the multiplexer via an amplifier 9a, while the other sources are connected to respective ones of the other inlets of the multiplexer via amplifiers 9b, 9c, 9d, and via delay lines d'2, d'3, d'4. To take into account the go-and-return path lengths of the waves, the delay lines d'2, d'3, and d'4 are dimensioned to create delays respectively equal to (T–w)/2, T–w, and 3(T–w)/2.

Compared with the preceding variant, this configuration offers the advantage of making it easier to adjust the delays, and of avoiding constraints on the quality of the stop filters.

The concatenation circuit of the invention may advantageously be used to constitute a bit time compression and packet-forming circuit by making provision to connect a plurality of such circuits in cascade. To illustrate this possibility, in particular as applied to a packet optical transmission system, a description follows of the case when the FIG. 4 circuit is connected in cascade with the FIG. 5 circuit, with reference to the timing diagrams in FIGS. 6A and 6B.

One of the input signals Ea–Ed of the transmitter terminal TX then constitutes the electrical input signal E1 of the FIG. 4 circuit. The timing diagram a) of FIG. 6A shows an example of how the amplitude of the signal Ea varies over time. Said amplitude is modulated between high levels and low levels that represent binary data B1, B2, . . . , B12 contained in successive bit times of duration T. In this example, the signal is of the NRZ type.

To perform time-division multiplexing on packets in real time, it is necessary firstly to compress the bit time of the signal in a ratio n not less than the number of channels of the time-division multiplex.

To perform such compression, the selection signal SEL1 acts as a sampling clock signal made up of pulses of frequency 1/T, of constant amplitude, of width w not more than T/n, and set substantially to the middles of the bit times of the signal Ea. The signal SEL1 is shown in the timing diagram b) of FIG. 6A, for the case when w=T/n, with n=4.

Modulating g1 sources 11 by the signal SEL1 delivers g1 optical sampling signals SC1–SC4 which, once they have been combined by the multiplexer 6 are modulated by the electrical input signal E1 which delivers g1 converted input signals Eλ1–Eλ4 to the circulator 8, as shown in the timing diagram c) of FIG. 6A. The delay circuit 4 reflects the delayed signals Er1–Er4 which are shown in the timing diagrams c) to f), in the particular case when g1=4. The combined signals constitute the output multiplex signal S1 of the circuit shown in FIG. 4.

The signal S1 is then used as the optical input signal E2 of the FIG. 5 circuit. The selection signal SEL2 modulating g2 sources 11' is shown in the timing diagram g) of FIG. 6A. This signal is made up of pulses of width g1.w, with a period g1.T, the pulses forming the time-windows of the signal E2. Naturally, the signal SEL2 is set so that each of the pulses that make it up covers g1 successive samples of the input signal Ea.

The circuit shown in FIG. 5 generates g2 second converted input signals Eλ'1–Eλ'4 shown in the timing diagram h). The signals Eλ'1–Eλ'4 represent the concatenated binary information of the electrical input signal E1 of the FIG. 4 circuit. Hence, there are blocks P1, P2, P3, each of which is made up of g1 binary data items, the blocks being of width g1.w with a period g1.T.

The block envelopes P3–P8 making up the signals Eλ'1–Eλ'4 are shown in the timing diagram a) of FIG. 6B. The delay circuit 4' delivers the second delayed signals E'r1–E'r4 whose envelopes are shown in respective ones of the timing diagrams a) to d), in the particular case when g2=4. The resulting multiplex signal S2 is shown in the timing diagram e), in which the blocks P1–P8 can be seen concatenated into groups of 4. In the general case, each of the groups includes g2 blocks, the groups are of width g2.g1.w, with a period g1.g2.T.

Thus, by coupling a plurality of concatenation circuits in cascade, it is possible to constitute a packet-forming circuit for forming packets grouping together any number of binary data items. This possibility is shown in FIG. 8 which shows a packet-forming circuit PF made up of concatenation circuits MC1, MC2, MCi, MCp coupled in cascade and controlled by respective ones of the selection signals SEL1, SEL2, SELi, SELp chosen to form groups respectively of g1, of g2, of g1, and of gp. The last concatenation stage MCp is connected to an output modulator MS controlled by the selection signal SEL(p+1) serving to retain the payload concatenated groups only. The packet-forming circuit PF may advantageously be used in the transmitter terminal TX of the above-described transmission system.

FIG. 9 shows an embodiment for putting two concatenation circuits in cascade. The cascade circuit is made up of two FIG. 5 circuits, and it has a single six-port circulator 12 making it possible to couple the optical input signal Ei to the inlet of a first stage MCi, and to couple the outlet of said first stage to the inlet of the following stage MC(i+1).

FIG. 10 shows an embodiment of a packet time-division multiplexer TDM that can be used in the transmitter terminal TX. The circuit is constituted merely by a delay circuit connected to the inlets of an "n-to-1" coupler 13. The delay circuit is made up of delay lines D, 2D, 3D so as to apply respective delays 0, U, 2U, 3U, . . . , nU to the n output signals Sa–Sd of the packet-forming circuits PF, where U is the duration of each packet formed by the circuits PF.

FIG. 11 shows an embodiment of the packet time-division demultiplexer TDD that can be used in the receiver terminal RX. This circuit includes a "1-to-n" coupler 14 receiving the signal Sy output by the network Z. The n outlets of the coupler 14 are connected to a modulator 15 via a delay circuit 3D, 2D, D as defined above. The modulator 15 is controlled by a control signal CT constituted by pulses of width equal to the width U of the packets and of period nU. The modulator 15 delivers at its outlets the compressed signals S'a–S'd corresponding to respective ones of the various channels of the transmitted time-division multiplex.

FIG. 12 shows an embodiment of a deconcatenation circuit making it possible to constitute a packet decompression circuit PD for the receiver terminal RX.

This circuit includes a set 16 of g' laser sources modulated by a selection signal SEL'. A first source is connected to a corresponding inlet of the multiplexer 17, while the other sources are connected to respective ones of the other inlets of a multiplexer 17 via delay lines d1, 2d1, 3d1 so as to deliver optical block-selection signals SB1–SB4 to the inlets of the multiplexer 17.

It includes a four-port circulator 19. A first port receives one of the compressed signals S'a, a second port is connected to a semiconductor optical amplifier 18, a third port is connected to a delay circuit 20 made up of filters F1, F2, F3, F4 connected in cascade via delay lines D2, and a fourth port delivers a deconcatenated signal S'p.

The amplifier 18 has a first port connected to the second port of the circulator 19 and a second port opposite from the first port and connected to the outlet of the multiplexer 17.

Operation of the circuit shown in FIG. 12 can be described by means of the timing diagrams of FIG. 13. The timing diagram a) shows one of the signals S'a which is made up of packets Pa1, Pa2, . . . of width U and of period Ta. Each packet Pa1, P2 is made up of data blocks B1–B4, B5–B8 that are to be deconcatenated. For this purpose, it is necessary merely to apply the selection signal SEL' shown in the timing diagram b). This signal is made up of pulses whose width U/g' is equal to that of the blocks B1–B8 and whose period is equal to the period Ta of the packets. Since the delay lines d1, 2d1, 3d1 are dimensioned to apply delays that are multiples of the block width, optical block-selection signals SB1–SB4 (not shown) are obtained that cover respectively the blocks B1 and B5, B2 and B6, B3 and B7, and B4 and B8. The optical block-selection signals SB1–SB4 are modulated by the signal S'a in the amplifier 18 which delivers converted block signals S'λ1–S'λ4 to the circulator 19, which signals are carried by respective ones of the wavelengths λ1–λ4. The envelopes of the signals S'λ1–S'λ4 are shown respectively in the timing diagrams c) to f).

With the filters F1–F4 being stop filters tuned to reflect respective ones of the wavelengths λ1–λ4, and with each of the delay lines D2 being dimensioned to create a delay equal to (Ta-U)/(2g'), the delay circuit 20 reflects the deconcatenated signal S'p. This signal S'p is thus obtained by combining and delaying the converted block signals S'λ1–S'λ4 so as to form delayed blocks of period Ta/g', as shown in the timing diagram g).

A first variant embodiment consists in coupling the outlet of the multiplexer 17 directly to the circulator 19, and in placing an amplifier between the first source and the first inlet of the multiplexer, and between each delay line d1, 2d1, 3d1 and a corresponding inlet of the multiplexer. This variant offers the advantage that the signal-to-noise ratio is independent of the number of sources, thereby making it possible to increase said number.

Another variant analogous to the embodiment shown in FIG. 7 consists in connecting the inlets of the multiplexer to the amplifiers via delay lines replacing the delay circuit 20.

This configuration offers the advantage of facilitating adjustment of the delays, and it avoids constraints on the quality of the stop filters of the delay circuit.

To implement the packet decompression circuit PD, it is possible to put in cascade a plurality of deconcatenation circuits as described above, thereby making it possible to re-establish the bit frequency of each channel to a value equal to the bit frequency of the input signals of the transmitter terminal. A final, pulse-spreading stage restores NRZ modulation.

FIG. 14 shows an embodiment of the spreader stage. The circuit includes a modulator MZ receiving firstly the outlet signal S'1 from the last of the deconcatenation circuits, and secondly a combination of carrier waves having different wavelengths λe–λh delivered by laser oscillators Le–Lh via a multiplexer M.

A circulator C has a first port connected to the outlet of the modulator MZ, a second port connected to a delay circuit, and a third port delivering a decompressed signal Ra. The delay circuit may be made up of stop filters Fe–Fh connected in cascade via delay lines D3. The filters Fe–Fh are tuned to reflect respective ones of the wavelengths λe–λh. To take into account the go and return path lengths of the waves, each of the delay lines D3 is dimensioned to create a delay substantially equal to w/2.

The signal Ra is applied to an optical-to-electrical converter OE constituted, for example, by a photodiode, so as to deliver the electrical output signal R'a.

The modulator MZ may be of interferometer structure, e.g. of the Mach-Zehnder type, organized to form constructive interference when the power level of the input signal S'1 is high.

In operation, the modulator MZ delivers auxiliary signals S–Sh carried by respective ones of the wavelengths λe–λh, each signal reproducing the modulation of the signal S'1, as shown in the timing diagram a) of FIG. 15. The auxiliary signals Se–Sh are reflected and delayed by the delay circuit, and they are then fed back into the circulator C. The corresponding delayed signals Re–Rh are shown respectively in the timing diagrams a) to d) of FIG. 15. The circulator C then delivers a combination of these signals that constitutes the decompressed signal Ra shown in the timing diagram e).

What is claimed is:

1. A method of concatenating binary information contained in successive time windows of an amplitude-modulated synchronous input signal, said windows being of duration w and of period T not less than twice the duration w, wherein, with g being a number lying in the range 2 to T/w, said method comprises:

forming g converted input signals by amplitude modulating respective ones of g optical carrier waves having different wavelengths, each converted input signal presenting, within said time windows, amplitude modulation as a function of said input signal; and forming a multiplex signal made up of a combination of g delayed signals obtained by applying delays to said converted input signals, the delays being such that any two consecutive delayed signals are offset in time by said duration w of the time windows.

2. A method according to claim 1, wherein said converted input signals are combined before said delays are applied to them, by making use of the differences in the wavelengths of said converted input signals.

3. A method according to claim 1, wherein said delays are applied to said converted input signals before they are combined.

4. A method of concatenating binary information contained in successive time windows of an amplitude-modulated synchronous input signal, said windows being of duration w and of period T not less than twice the duration w, g being a number lying in the range 2 to T/w, said method comprising:

forming g converted input signals by amplitude modulating respective ones of g optical carrier waves having different wavelengths, each converted input signal presenting; within said time windows, amplitude modulation as a function of said input signal: and forming a multiplex signal made up of a combination of g delayed signals obtained by applying delays to said converted input signals, the delays being such that any two consecutive delayed signals are offset in time by said duration w of the time windows, wherein, with said input signal being a binary signal of period T, said converted input signals are obtained by amplitude modulating said carrier waves by a sampling clock signal constituted by pulses of frequency 1/T, of constant amplitude, and of width equal to said duration w so as to form g optical sampling signals, and then by respectively amplitude modulating said optical sampling signals as a function of said input signal.

5. A method according to claim 1, wherein, with said input signal being a binary signal constituted by pulses of frequency not less than 2/T and including blocks of binary data contained in respective ones of said successive time windows, said converted input signals are obtained by amplitude modulating said carrier waves by a selection signal constituted by pulses of frequency 1/T, of constant amplitude, and of width equal to said duration w, so as to form g optical selection signals, and then by respectively amplitude modulating said optical selection signals as a function of said input signal.

6. A method of forming packets grouping together binary information contained in successive time windows of a synchronous amplitude-modulated input signal, said windows being of duration w and of period T not less than twice the duration w, said method comprising:

a first concatenation step comprising applying to said input signal a concatenation method of concatenating binary information contained in successive time windows thereof, said windows being of duration w and of period T not less than twice the duration w, with g1 being a number lying in the range 2 to T/w, said concatenation step comprising:

forming g1 converted input signals obtained by amplitude modulating respective ones of g1 optical carrier waves having different wavelengths, each converted input signal presenting, within said time windows, amplitude modulation as a function of said input signal; and forming a first multiplex signal made up of a combination of g1 delayed signals obtained by applying delays to said converted input signals, the delays being such that any two consecutive delayed signals are offset in time by said duration w of the time windows; and at least one subsequent concatenation step comprising considering said first multiplex signal as an input signal whose time windows are of period g1.T, and in applying thereto said concatenation method whereby, with said input signal being a binary signal constituted by pulses of frequency not less than 2/T and including blocks of binary data contained in respective ones of said successive time windows, said converted input signals are obtained by amplitude modulating said carrier waves by a selection signal constituted by pulses of frequency 1/T, of constant amplitude, and of width equal to said duration w, so as to form g1 optical selection signals, and then by respectively amplitude modulating said optical selection signals as a function of said input signal, wherein each time window covers g1 successive time windows of the input signal.

7. A method of deconcatenating packets of binary information contained in an amplitude-modulated synchronous received signal, said packets being of period Ta, and each of them including g' successive blocks of binary information, said method comprising:

breaking down said received optical signal into g' converted block signals by amplitude modulating respective ones of g' optical carrier waves having different wavelengths, each converted block signal presenting amplitude modulation as a function of the binary information contained in blocks of period Ta and belonging to successive packets of the received optical signal; and forming a deconcatenated signal obtained by combining and delaying said converted block signals so as to form the delayed blocks of period Ta/g'.

8. A concatenation. circuit for concatenating binary information contained in successive time windows of an amplitude-modulated synchronous input signal, said windows being of duration w and of period T not less than twice the duration w, wherein, with g being a number lying in the range 2 to T/w, said circuit comprises:

a combiner and amplitude modulator forming g converted input signals obtained by amplitude modulating respective ones of g optical carrier waves having different wavelengths, each converted input signal presenting, within said time windows, amplitude modulation as a function of said input signal; and a multiplexer for forming a multiplex signal made up of a combination of g delayed signals obtained by applying delays to said converted input signals, the delays being such that any two consecutive delayed signals are offset in time by said duration w of the time windows.

9. A concatenation circuit according to claim 8, wherein said combiner and amplitude modulator comprises:

a signal combiner forming and combining g optical sampling signals or optical selection signals constituted by respective ones of optical sampling pulses or of optical selection pulses carried by said different wavelengths, of frequency 1/T, and of width equal to said duration w; and an amplitude modulator amplitude modulating said optical sampling signals or said optical selection signals combined as a function of the amplitude of said input signal.

10. A concatenation circuit according to claim 9, wherein said multiplexer comprises:

a delay circuit formed of g stop filters tuned to reflect respective ones of said different wavelengths and coupled in cascade via g−1 delay lines, each of which is dimensioned to create a delay equal to (T−w)/2; and a coupler disposed to connect the outlet of said combiner and amplitude modulator to said delay circuit and to extract therefrom the waves that it reflects.

11. A concatenation circuit according to claim 9, wherein, with said input signal being an electrical signal, said amplitude modulator comprises an electro-optical modulator controlled by said input signal and receiving said combined optical sampling signals, or said combined optical selection signals.

12. A concatenation circuit according to claim 9, wherein, with said input signal being an optical signal, said amplitude modulator comprises a semiconductor optical amplifier medium receiving said input signal via a first port, and receiving said combined optical sampling signals or said combined optical selection signals via an opposite port.

13. A circuit for forming packets grouping together binary information contained in successive time windows of an amplitude-modulated synchronous input signal, said windows being of duration w and of period T not less than twice the duration w, said circuit comprising a plurality of concatenation circuits according to claim 8 connected in cascade.

14. A communications system comprising an optical network, at least one transmitter terminal and at least one receiver terminal, wherein at least one of said transmitter terminals includes packet-forming circuits according to claim 13 having outlets coupled to an optical circuit for time-division multiplexing packets, and wherein at least one of said receiver terminals includes an optical circuit for time-division demultiplexing packets.

15. A method according to claim 4, wherein said converted input signals are combined before said delays are applied to them, by making use of the differences in the wavelengths of said converted signals.

16. A method according to claim 4, wherein said delays are applied to said converted input signals before they are combined.

* * * * *